No. 855,456. PATENTED JUNE 4, 1907.
H. A. HILLENBRAND.
LATHE CHUCK.
APPLICATION FILED FEB. 23, 1906.
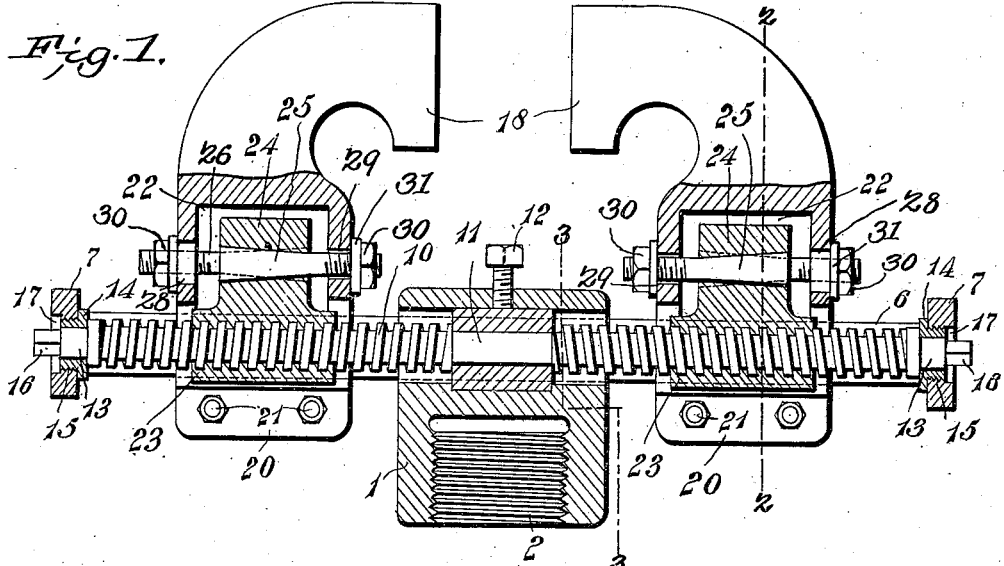
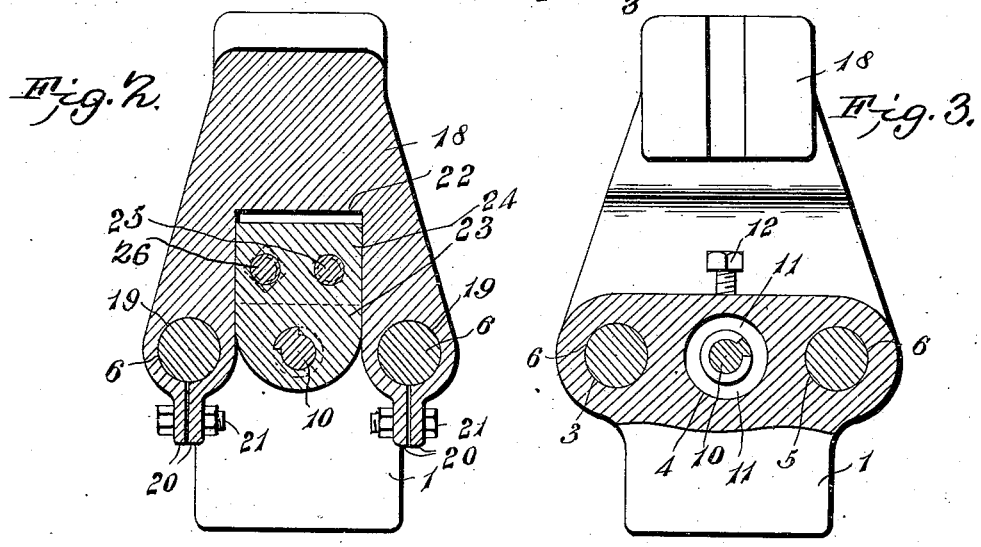
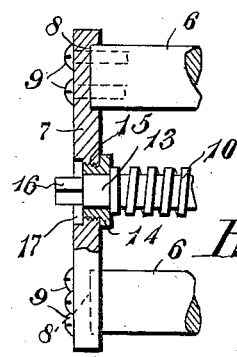
WITNESSES:
Herman A. Hillenbrand,
INVENTOR
By C. A. Snow & Co.
ATTORNEYS

UNITED STATES PATENT OFFICE.

HERMAN ARCHER HILLENBRAND, OF LOUISVILLE, KENTUCKY.

LATHE-CHUCK.

No. 855,456.　　　Specification of Letters Patent.　　　Patented June 4, 1907.

Application filed February 23, 1906. Serial No. 302,567.

*To all whom it may concern:*

Be it known that I, HERMAN ARCHER HILLENBRAND, a citizen of the United States, residing at Louisville, in the county of Jefferson and State of Kentucky, have invented a new and useful Lathe-Chuck, of which the following is a specification.

This invention relates to lathe chucks, and has for its object to provide an improved two jaw chuck and to enable the convenient simultaneous adjustment of the jaws in a simple and efficient manner.

A further object of the invention is to enable the convenient assemblage of the parts of the chuck and to provide for locking each jaw against working loose after it has been set to the work.

With these and other objects in view, the present invention consists in the combination and arrangement of parts as will be hereinafter more fully described, shown in the accompanying drawing and particularly pointed out in the appended claims, it being understood that changes in the form, proportion, size and minor details may be made, within the scope of the claims without departing from the spirit or sacrificing any of the advantages of the invention.

In the drawing: Figure 1 is a longitudinal sectional view of a lathe chuck embodying the features of the present invention. Fig. 2 is a sectional view on the line 2—2 of Fig. 1. Fig. 3 is a similar view on the line 3—3 of Fig. 1. Fig. 4 is a fragmentary plan view with parts broken away to show the manner of mounting one end of the rotary adjusting screw.

Like characters of reference designate corresponding parts in all of the figures of the drawing.

The present device includes a head 1 provided in its rear end with a longitudinal socket 2, threaded or otherwise, for connection with the live spindle of a lathe. The forward end of the head is laterally enlarged and pierced by three circular openings designated 3, 4 and 5, the opening 4 being in the center of the enlarged portion of the head, and the three openings extending at substantially right angles to the socket 2.

Smooth cylindrical rods 6 have their middle portions received within the respective openings 3 and 5, each pair of their corresponding ends being connected by a cross bar or plate 7 having terminal sockets or seats 8 formed in its inner face for the reception of the ends of the rods 6, suitable fastenings 9 being set through the plate and into the rods to hold the latter against turning.

The center opening 4 of the head receives the adjusting screw 10 which is reversely threaded at opposite sides of its middle and has terminal bearings in the plates 7. The middle of the adjusting screw is smooth and embraced by a split bushing 11, there being a set screw 12 piercing the forward end of the head and engaging one of the sections of the bushing so as to hold the same against endwise displacement. Each end of the adjusting screw is provided with a cylindrical spindle or bearing portion 13 mounted to rotate in a bushing 14 threaded into an opening 15 in the middle of the adjacent plate 7 and a washer is interposed between the inner end of the bushing 14 and the outer end of the screw. Each extremity of the adjusting screw is provided with a non-circular wrench head 16 for engagement by a socket wrench, and the other face of the plate 7 is provided with a socket 17 concentric with the wrench head so as to receive a wrench when applied to the head.

Mounted to slide upon the rods 6 between the head 1 and each plate 7 is a jaw 18, and as the two jaws are duplicates in construction and mounting, a description of one of them is deemed sufficient. Each jaw is provided at its rear end with parallel passages 19 for the reception of the respective guide rods 6, the rear wall of each passage being split and reduced to form fingers or ears 20 pierced by fastenings 21, such as bolts, to hold the jaw upon the guide rods so as to prevent unnecessary lateral play without interfering with the desired slidable movements of the jaw endwise upon the guide rods. The rear end of the jaw is bifurcated so as to receive the adjusting screw, and in the back of the bifurcation is a socket 22 for the reception of a nut 23 through which the screw is received. The nut is provided with a boss or stem 24 which is received within the socket 22 and is provided with a pair of reversely tapered open ended passages receiving the tapered pins 25 and 26. In the outer side of the jaw there is an opening 28 slightly greater in diameter than the large end of the pin 25 to permit of the latter being passed through one of the tapered openings in the part 24. The small end of the pin is threaded and projects loosely through an opening 29 in the inner side of the jaw, and a nut 30 is provided upon the threaded end of the pin for adjusting the latter endwise. By preference, a washer 31 is interposed between the nut and the jaw. A similar arrangement is made for the other pin 26 except that the relation of the openings 28 and 29 is reversed. By means of these pins, the jaws can be independently adjusted in relation to the screw 10 so that the meeting faces of the jaws will be brought into exact alinement with the center of rotation or the axis of the live spindle of the lathe. The adjustment of each jaw is accomplished by loosening the nut 30 of one of the pins 25 and drawing up the nut 30 of the other pin. This will move the jaw independently of the nut 23 which is held stationary for the time being on the screw 10. It will thus be seen that a very fine adjustment of the jaws on their nuts can be made. Furthermore, by means of this independent adjustment of the jaws, the latter can be adjusted so that their meeting edges will be eccentric to the axis of rotation when such is found desirable.

In practice, the chuck is connected to the live spindle of a lathe through the medium of the head 1, the work being received between the jaws and the latter set against the work by turning the adjusting screw. After the jaws have been set to the work, the nuts 21 of each jaw can be tightened, if desired, so as to hold the jaw firmly in place.

Having thus described the invention, what is claimed is:

1. A chuck comprising a head, a pair of spaced guide rods carried by the head and projecting at opposite sides thereof, a reversely threaded adjusting screw journaled upon the head and projecting at opposite sides thereof, jaws slidable upon the guide rods, nuts engaged by the adjusting screw, and adjustable connections between the nuts and jaws.

2. A chuck comprising a head, an adjusting screw carried by the head, a jaw slidable toward and away from the head, a nut carried by the jaw and engaged by the screw, and means independent of the screw to shift the jaw for fine adjustments.

3. A chuck comprising a head, an adjusting screw carried thereby, a jaw, a shiftable nut carried by the jaw and engaging the screw, and means engaging the jaw and the nut to shift the jaw.

4. A chuck comprising a head, an adjusting screw carried thereby, a jaw having a socket in the back thereof, a nut receiving the screw and having a stem portion loose in the socket of the jaw, and an endwise adjustable tapered pin piercing the jaw and the stem of the nut to shift the jaw.

5. In a chuck, the combination of a head having one end formed for connection with a lathe screw and its other end pierced by three substantially parallel openings, guide rods passing through two of the openings, cross bars connecting the ends of the guide rods, a reversely threaded adjusting screw passing through the other opening of the head and terminally journaled in the cross bars, bifurcated jaws straddling the screw and slidably pierced by the guide rods, each jaw having a socket in the back of its bifurcation, nuts receiving the screw and provided with stems loosely received within the respective sockets, and tapered adjusting pins piercing the jaws and stems of the nuts.

6. A chuck comprising a head, an adjusting screw carried thereby, a jaw having a socket, a nut receiving the screw and having a stem portion loose in the socket of the jaw, the stem portion being provided with reversely tapered openings, reversely tapered pins extending through the openings with their small ends threaded and loosely piercing the respective inner and outer sides of the jaw, and nuts fitted to the threaded ends of the pins and bearing against the jaws.

In testimony that I claim the foregoing as my own, I have hereto affixed my signature in the presence of two witnesses.

HERMAN ARCHER HILLENBRAND.

Witnesses:
  C. B. HILLENBRAND,
  JOHN T. EPPERSON.